US011928061B2

(12) United States Patent
Song

(10) Patent No.: US 11,928,061 B2
(45) Date of Patent: Mar. 12, 2024

(54) CACHE MANAGEMENT METHOD AND APPARATUS

(71) Applicant: Huawei Technologies Co., Ltd., Shenzhen (CN)

(72) Inventor: Chang Song, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 17/687,996

(22) Filed: Mar. 7, 2022

(65) Prior Publication Data

US 2022/0188230 A1     Jun. 16, 2022

Related U.S. Application Data

(63) Continuation of application No. PCT/CN2020/113309, filed on Sep. 3, 2020.

(30) Foreign Application Priority Data

Jan. 16, 2020   (CN) .......................... 202010047039.4
Apr. 14, 2020   (CN) .......................... 202010291665.8

(51) Int. Cl.
*G06F 12/08*     (2016.01)
*G06F 12/02*     (2006.01)
(Continued)

(52) U.S. Cl.
CPC ........ *G06F 12/084* (2013.01); *G06F 12/0246* (2013.01); *G06F 12/0871* (2013.01); *G06F 12/128* (2013.01); *G06F 2212/2542* (2013.01)

(58) Field of Classification Search
CPC ............... G06F 12/084; G06F 12/0868; G06F 12/0871; G06F 12/0888; G06F 12/0246; G06F 12/128; G06F 2212/2542
See application file for complete search history.

(56) References Cited

U.S. PATENT DOCUMENTS 10,325,343 B1    6/2019   Zhao et al.
2012/0311269 A1   12/2012   Loh et al.
(Continued)

FOREIGN PATENT DOCUMENTS

CN     103544269 A     1/2014
CN     108900570 A    11/2018
(Continued)

OTHER PUBLICATIONS

Wu Junjie et al., "Pre-promotion with Arbitrary Strides in Non-uniform Caches," Journal of Frontiers of Computer Science and Technology, Accepted Mar. 2010, with an English translation, 22 pages.

*Primary Examiner* — Ernest Unelus
(74) *Attorney, Agent, or Firm* — Conley Rose, P.C.

(57) ABSTRACT

A data management method is applied to a computing system. The computing system includes a plurality of NUMA nodes, each NUMA node includes a processor and a memory, and each memory is used to store a data block. In the method, a processor in a NUMA node receives an operation request for a data block, and the processor processes the data block, and allocates a replacement priority of the data block in cache space of the NUMA node based on an access attribute of the data block, where the access attribute of the data block includes a distance between a home NUMA node of the data block and the NUMA node.

20 Claims, 9 Drawing Sheets

(51) Int. Cl.
*G06F 12/084* (2016.01)
*G06F 12/0871* (2016.01)
*G06F 12/128* (2016.01)

(56) References Cited

U.S. PATENT DOCUMENTS

| | | |
|---|---|---|
| 2015/0113230 A1 | 4/2015 | Cheng |
| 2015/0262632 A1* | 9/2015 | Shelton .............. G06F 12/0684 |
| | | 711/103 |
| 2019/0042416 A1 | 2/2019 | Doshi et al. |
| 2020/0042358 A1 | 2/2020 | Sun et al. |

FOREIGN PATENT DOCUMENTS

| | | |
|---|---|---|
| CN | 109388490 A | 2/2019 |
| CN | 110098945 A | 8/2019 |
| KR | 20050015250 A | 2/2005 |

\* cited by examiner ature of the page
CACHE MANAGEMENT METHOD AND APPARATUS

CROSS-REFERENCE TO RELATED APPLICATIONS

This is a continuation of Int'l Patent App. No. PCT/CN2020/113309, filed on Sep. 3, 2020, which claims priority to Chinese Patent App. No. 202010047039.4, filed on Jan. 16, 2020, and Chinese Patent App. No. 202010291665.8, filed on Apr. 14, 2020, all of which are incorporated by reference.

FIELD

This disclosure relates to the computer field, and in particular, to a cache management method and an apparatus in a non-uniform memory access (NUMA) architecture.

BACKGROUND

With rapid development of information technology (IT) technologies, there is an increasing amount of data in various IT systems, for example, some servers used for key services of enterprises. These services are the core of enterprise applications. This determines that the data and information processed by the servers are core business data and information of users and are usually massive. According to the three most common applications in some key service fields: online transaction, business analysis, and database, even if the applications are used in a common enterprise, the amount of data processed by the applications may be astonishing, let alone a terabyte (TB)-level or petabyte (PB)-level data amount that is easily faced with when the applications run in industries such as banking, telecommunications, and securities. Such an amount of data affects production, operation, and decision-making efficiency of commercial users. Therefore, a bearer platform of the services needs to have an excellent high-performance processing capability. In addition, with emergence of a large-scale memory database application such as high-performance analytic appliance (HANA), there is a very high requirement on a memory capacity of a single server system. Therefore, more processors and memories need to be integrated into a single server to meet the high performance and large capacity requirements of service running.

To integrate a plurality of processors in a single server, a system architecture that can support multiprocessing may be required. The multiprocessing means that two or more central processing units (CPUs) are used in a single computing system, and computing work may be allocated to these processing units. Therefore, a multi-CPU interconnection technology is derived. To be specific, a plurality of CPUs are interconnected by using connection cables between the CPUs, for example, quick path interconnects (QPIs), so that the plurality of physical CPUs can be interconnected by using these connection cables, to form a resource-sharing server system.

Symmetric multiprocessing (SMP) is a common multiprocessor computer hardware architecture. In a symmetric multiprocessor architecture, all processors have equal statuses, and have the same permission to use resources. Currently, most multiprocessor systems use the SMP architecture, and are also called SMP systems. In this system, there is more than one processor. These processors are all connected to a same shared primary storage and controlled by a single operating system. In an example of a multi-core processor, an SMP architecture considers each core as an independent processor. On an SMP system, with support of an operating system, a process may be allocated to any processor for running, regardless of whether the process is in user space or core space. Therefore, the process may be moved between different processors to achieve load balancing and improve system efficiency.

A NUMA architecture is a memory architecture designed for a multiprocessor computer. Memory access time depends on a location of a memory relative to a processor. In the NUMA architecture, a processor accesses a memory located on a same node as the processor more quickly than a non-local memory (to be specific, the memory is located on another node or is a memory shared by a plurality of processors). The non-uniform memory access architecture has the following feature: shared memories are physically distributed, and a collection of all these memories is global address space. Therefore, time for the processor to access these memories is different. It is clear that a speed of accessing a local memory is faster than that of accessing a global shared memory or a remote memory. In the NUMA architecture, memories are divided into a local memory and a remote memory, and compared with accessing the local memory, accessing the remote memory by a CPU has lower memory access bandwidth and a higher access latency. As a total quantity of CPUs in the system increases, limits of the remote memory access latency and bandwidth will severely affect overall performance of the system.

To reduce average time required by a CPU to access data in a memory, a cache is usually set in the computing system to store frequently-used data. The cache is also referred to as cache space or a high-speed cache. A speed at which a processor accesses the cache is only second to a speed at which the processor accesses a register in the processor. In addition, a capacity of the cache is usually much smaller than that of the memory. Therefore, the cache is usually configured to store data and instructions to be used by the CPU recently. Due to a memory access locality principle of a program, the cache can effectively reduce a quantity of memory access times, so that a memory wall problem is alleviated. However, a current main management algorithm for the cache is a least recently used (LRU) algorithm, that is, an LRU replacement algorithm. The LRU replacement algorithm is used to select and eliminate a page that is not used for the longest time. This algorithm assigns an access field to each page, to record time (t) that has elapsed since last access to a page. When a page needs to be eliminated, a page with a largest t value (namely, a least recently used page) in an existing cache is selected and eliminated.

However, in the NUMA architecture, a solution with optimal system performance cannot be obtained by using a conventional LRU replacement algorithm to manage a cache.

SUMMARY

This disclosure proposes a new cache replacement policy, used to manage data in a cache, so that system performance can be improved in a computing system using a NUMA architecture.

According to a first aspect, in a data management method applied to a computing system, the computing system includes a plurality of NUMA nodes, each NUMA node includes a processor and a memory, each memory is configured to store a data block, and the method includes: A first processor receives an operation request for a first data block, where the first processor is a processor in a first NUMA node. The first processor processes the first data block, and allocates a replacement priority of the first data block in first cache space based on an access attribute of the first data block, where the first cache space is cache space in the first NUMA node, the access attribute of the first data block includes a distance between a home NUMA node of the first data block and the first NUMA node, and the home NUMA node of the first data block is a NUMA node to which a home memory address of the first data block points.

In an existing technology, a policy such as an LRU algorithm is usually used for cache management of a computing system, and a data block that is frequently accessed by a processor is reserved in cache space by using a memory access locality principle of the computing system. However, in a computing system using a NUMA architecture, the policy such as the LRU replacement algorithm does not consider that access overheads generated when a processor accesses memories in different NUMA nodes are different. In a technical solution, when processing a data block to which an operation request points, a processor simultaneously allocates a replacement priority of the data block in cache space based on an access attribute of the data block, where the access attribute includes a distance between a home NUMA node of the data block and a NUMA node in which the processor is located. The foregoing technical solution is used, so that the distance between the home NUMA node of the data block and the NUMA node in which the processor is located is included as a factor considered in a cache replacement policy. This helps the processor reduce, in the computing system using the NUMA architecture, access to a memory in a remote NUMA node, thereby improving efficiency of the computing system.

According to the first aspect, in a possible implementation, a larger distance from the home NUMA node of the first data block to the first NUMA node indicates a lower replacement priority of the first data block, and the lower replacement priority indicates that the data block is stored in the cache space for longer time.

The foregoing technical solution further defines a method for determining a replacement priority based on a distance between NUMA nodes and a function of the replacement priority. The foregoing technical solution is used, so that a lower replacement priority is assigned to a data block in a NUMA node that is farther from the NUMA node in which the processor is located. In this way, this part of data block is stored in cache space for longer time. This helps the computing system reduce access overheads generated when the processor accesses a memory in the farther NUMA node, so as to improve efficiency of the computing system.

According to the first aspect, in another possible implementation, the access attribute of the first data block further includes any one of or any combination of the following factors: an access latency generated when the first processor accesses the home NUMA node of the first data block; a quantity of times that the first processor accesses a memory in the home NUMA node of the first data block within preset time; or a corresponding cache loss rate for accessing, by the first processor, a data block in a memory in the home NUMA node of the first data block within preset time.

The foregoing technical solution discloses the affecting factor that the access attribute may further include. A replacement priority of a data block in cache space is determined based on any one of or any combination of the affecting factors, and this helps comprehensively consider, during determining of a data replacement policy in a cache, memory access locality and overheads generated when a processor accesses a memory when a cache miss occurs. In this way, a function, of the cache, for data access by the processor is improved, and the efficiency of the computing system is improved.

According to the first aspect, in another possible implementation, that the first processor processes the first data block, and allocates a replacement priority of the first data block in first cache space based on an access attribute of the first data block includes: The first processor determines whether the first cache space stores the first data block. When the first processor determines that the first cache space does not store the first data block, the first processor writes the first data block into the first cache space. The first processor allocates an initial replacement priority of the first data block in the first cache space to the first data block.

According to the foregoing solution, when a data block that needs to be accessed by a processor is not stored in cache space, the data block is stored in the cache space and an initial priority is allocated to the data block, so that the processor can directly read the data block from the cache space in subsequent access. In this way, the efficiency of the computing system can be further improved.

According to the first aspect, in another possible implementation, before that the first processor writes the first data block into the first cache space, the method further includes: The first processor determines that a second data block in the first cache space currently has a highest replacement priority, and removes the second data block from the first cache space.

According to the foregoing solution, before a data block accessed by the processor is written into cache space, a data block that currently has a highest replacement priority may be removed from the cache space first, so as to avoid that the cache space does not have plenty of storage space to store the data block accessed by the processor, and remove a data block that does not need to be stored in the cache space. In this way, stability and the efficiency of the computing system can be improved.

According to the first aspect, in another possible implementation, that the first processor processes the first data block, and allocates a replacement priority of the first data block in first cache space based on an access attribute of the first data block includes: The first processor determines whether the first cache space stores the first data block. When determining that the first cache space stores the first data block, the first processor updates the replacement priority of the first data block in the first cache space from a current value to an initial value.

According to the foregoing solution, when a data block is accessed by a processor, a replacement priority of the data block is updated to an initial value, so that the data block is stored in cache space for longer time, and this complies with a memory access locality principle, so as to help improve the efficiency of the computing system.

According to the first aspect, in another possible implementation, the method further includes: The first processor adjusts a replacement priority of another data block in the first cache space.

According to the first aspect, in another possible implementation, the adjusting a replacement priority of another data block in the first cache space includes: increasing a replacement priority of another data block whose replacement priority in the first cache space is between the initial value and the current value.

The foregoing solution discloses a method, in the cache replacement policy provided, for adjusting a replacement priority of another data block when a replacement priority corresponding to a data block accessed by a processor is adjusted. In the policy provided, each data block has an initial replacement priority. Therefore, a replacement priority of another data block is adjusted, so that a data block whose initial replacement priority is lower may be replaced when the data block is not accessed by the processor for a long time. In this way, the policy provided has a better effect, and the efficiency of the computing system is improved.

According to a second aspect, a data management method is applied to a computing system, the computing system includes a plurality of NUMA nodes, each NUMA node includes a processor and a memory, each memory is configured to store a data block, and the method includes: A first processor receives an operation request for a first data block, where the first processor is a processor in a first NUMA node. The first processor writes the first data block into a first cache line set in the first cache space, where the first cache space is cache space in the first NUMA node, and the first cache line set corresponds to a home NUMA node of the first data block.

In the foregoing solution, cache space is divided based on memories in different NUMA nodes, so that different cache line sets in the cache space correspond to the memories in the different NUMA nodes. When processing a data block, the processor stores the data block into a corresponding cache line set based on a NUMA node to which the data block belongs. This solution ensures a proportion, in the cache space, of data in a memory in a farther NUMA node, so as to reduce overheads of memory access by the processor and improve efficiency of the computing system.

According to a third aspect, a data management method is applied to a computing system using a NUMA architecture. The computing system includes a first storage set and a second storage set. Storages in the first storage set are distributed in NUMA nodes. A storage capacity of a storage in the first storage set is smaller, but a speed of accessing the storage in the first storage set by a processor is higher. A storage capacity of a storage in the second storage set is larger, but a speed of accessing the storage in the second storage set by a processor is lower. The method includes: A first processor receives the operation request for a first data block. When the first data block is stored in a first storage, a replacement priority of a storage entry in the first storage is updated.

A replacement priority is set for each storage entry in the first storage, and the replacement priority is updated based on an access status of a processor. This helps reduce overheads caused by memory access by the processor. In this way, efficiency of the computing system is improved.

According to the third aspect, in a possible implementation, when the first data block is not stored in the first storage, it is first determined whether the first storage has storage space for storing the first data block. If the first storage does not have the storage space, a data block stored in a storage entry whose replacement priority is currently the highest is replaced, a to-be-read first data block is stored in the first storage, and a replacement priority of the storage entry is updated.

According to the foregoing method, the to-be-accessed first data block may be stored in the first storage when the first data block is not stored in the first storage, so that the processor subsequently continues to access the first data block. In addition, before the first data block is written into the first storage, it is checked whether there is plenty of storage space, and when there is not plenty of storage space, the data block stored in the storage entry whose replacement priority is currently the highest is replaced. In this way, stability and the efficiency of the computing system can be improved.

According to a fourth aspect, a data management apparatus is used in a computing system. The computing system includes a plurality of NUMA nodes. Each NUMA node includes a processor and a memory. Each memory is configured to store a data block. The data management apparatus is disposed in a first NUMA node, and includes: a receiving module configured to receive an operation request for a first data block; and a processing module configured to: process the first data block, and allocate a replacement priority of the first data block in first cache space based on an access attribute of the first data block, where the first cache space is cache space in the first NUMA node, the access attribute of the first data block includes a distance between a home NUMA node of the first data block and the first NUMA node, and the home NUMA node of the first data block is a NUMA node to which a home memory address of the first data block points.

According to the fourth aspect, in a possible implementation, a larger distance from the home NUMA node of the first data block to the first NUMA node indicates a lower replacement priority of the first data block, and the lower replacement priority indicates that the data block is stored in the cache space for longer time.

According to the fourth aspect, in another possible implementation, the access attribute of the first data block further includes any one of or any combination of the following factors: an access latency generated when the data management apparatus accesses the home NUMA node of the first data block; a quantity of times that the data management apparatus accesses a memory in the home NUMA node of the first data block within preset time; or a corresponding cache loss rate for accessing, by the data management apparatus, data in a memory in the home NUMA node of the first data block within preset time.

According to the fourth aspect, in another possible implementation, the processing module is further configured to: determine whether the first cache space stores the first data block; when determining that the first cache space does not store the first data block, write the first data block into the first cache space; and allocate an initial replacement priority of the first data block in the first cache space to the first data block.

According to the fourth aspect, in another possible implementation, the processing module is further configured to: determine that a second data block in the first cache space currently has a highest replacement priority, and remove the second data block from the first cache space.

According to the fourth aspect, in another possible implementation, the processing module is configured to: determine whether the first cache space stores the first data block; and when determining that the first cache space stores the first data block, update the replacement priority of the first data block in the first cache space from a current value to an initial value.

According to the fourth aspect, in another possible implementation, the processing module is further configured to adjust an update priority of another data block in the first cache space.

According to the fourth aspect, in another possible implementation, the processing module is further configured to adjust a replacement priority of another data block whose replacement priority in the first cache space is between the initial value and the current value.

According to a fifth aspect, a data management apparatus is used in a computing system. The computing system includes a plurality of NUMA nodes. The NUMA node includes a memory. Each memory is configured to store a data block. The data management apparatus is disposed in a first NUMA node. The data management apparatus includes: a receiving module configured to receive an operation request for a first data block; and a processing module configured to write the first data block into a first cache line set in the first cache space, where the first cache space is cache space in the first NUMA node, and the first cache line set corresponds to a home NUMA node of the first data block.

According to a sixth aspect, a data management apparatus is used in a computing system using a NUMA architecture. The computing system includes a first storage set and a second storage set. Storages in the first storage set are distributed in NUMA nodes. A storage capacity of a storage in the first storage set is smaller, but a speed of accessing the storage in the first storage set by a processor is higher. A storage capacity of a storage in the second storage set is larger, but a speed of accessing the storage in the second storage set by a processor is lower. The data management apparatus is disposed in a first NUMA node. The data management apparatus includes: a receiving module configured to receive an operation request for a first data block; and a processing module configured to: when the first data block is stored in a first storage, update a replacement priority of a storage entry in the first storage.

According to the sixth aspect, in a possible implementation, the processing module is further configured to: when the first data block is not stored in the first storage, first determine whether the first storage has storage space for storing the first data block; and if the first storage does not have the storage space, replace a data block stored in a storage entry whose replacement priority is currently the highest, store a to-be-read first data block in the first storage, and update a replacement priority of the storage entry.

According to a seventh aspect, a computing system includes a plurality of NUMA nodes, and each NUMA node includes a processor and a memory. The processor in each NUMA node is configured to: receive an operation request for a data block, and process the data block, where when processing an operation request for a first data block, a first processor in a first NUMA node in the plurality of NUMA nodes is further configured to allocate a replacement priority of the first data block in a first cache space based on an access attribute of the first data block, where the first cache space is cache space in the first NUMA node, the access attribute of the first data block includes a distance between a home NUMA node of the first data block and the first NUMA node, and the home NUMA node of the first data block is a NUMA node to which a home memory address of the first data block points.

According to the seventh aspect, in a possible implementation, a larger distance from the home NUMA node of the first data block to the first NUMA node indicates a lower replacement priority of the first data block, and the lower replacement priority indicates that the data block is stored in the cache space for longer time.

According to the seventh aspect, in another possible implementation, the access attribute of the first data block includes any one of or any combination of the following factors: an access latency generated when the first processor accesses the home NUMA node of the first data block; a quantity of times that the first processor accesses a memory in the home NUMA node of the first data block within preset time; or a corresponding cache loss rate for accessing, by the first processor, a data block in a memory in the home NUMA node of the first data block within preset time.

According to the seventh aspect, in another possible implementation, the first processor is configured to: determine whether the first cache space stores the first data block; when determining that the first cache space does not store the first data block, write the first data block into the first cache space; and allocate an initial replacement priority of the first data block in the first cache space to the first data block.

According to the seventh aspect, in another possible implementation, the first processor is further configured to: determine that a second data block in the first cache space currently has a highest replacement priority; and remove the second data block from the first cache space.

According to the seventh aspect, in another possible implementation, the first processor is configured to: determine whether the first cache space stores the first data block; and when determining that the first cache space stores the first data block, update the replacement priority of the first data block in the first cache space from a current value to an initial value.

According to the seventh aspect, in another possible implementation, the first processor is further configured to adjust a replacement priority of another data block in the first cache space.

According to the seventh aspect, in another possible implementation, the first processor is configured to increase a replacement priority of another data block whose replacement priority in the first cache space is between the initial value and the current value.

According to an eighth aspect, a computing system includes a plurality of NUMA nodes, and each NUMA node includes a processor and a memory. The processor in each NUMA node is configured to: receive an operation request for a data block, and process the data block, where when processing an operation request for a first data block, a first processor in a first NUMA node in the plurality of NUMA nodes is further configured to write the first data block into a first cache line set in the first cache space, where the first cache space is cache space in the first NUMA node, and the first cache line set corresponds to a home NUMA node of the first data block.

According to a ninth aspect, a computing system is used in a computing system using a NUMA architecture. The computing system includes a first storage set and a second storage set. Storages in the first storage set are distributed in NUMA nodes. A storage capacity of a storage in the first storage set is smaller, but a speed of accessing the storage in the first storage set by a processor is higher. A storage capacity of a storage in the second storage set is larger, but a speed of accessing the storage in the second storage set by a processor is lower. A processor in each NUMA node is configured to: receive an operation request for a data block, and process the data block. When processing an operation request for a first data block, a first processor in a first NUMA node in a plurality of NUMA nodes is further configured to: when the first data block is stored in a first storage, update a replacement priority of a storage entry in the first storage.

According to the ninth aspect, in a possible implementation, the first processor is further configured to: when the first data block is not stored in the first storage, first determine whether the first storage has storage space for storing the first data block; and if the first storage does not have the storage space, replace a data block stored in a storage entry whose replacement priority is currently the highest, store a to-be-read first data block in the first storage, and update a replacement priority of the storage entry.

According to a tenth aspect, a computer apparatus includes a processor and a storage. The storage is configured to store a computer program. The processor is configured to execute the computer program in the storage, to implement the data management method according to the first aspect, the second aspect, and the third aspect.

According to an eleventh aspect, a storage medium is configured to store a computer program. When the computer program is read and executed by a processor, the computer apparatus may be enabled to implement the data management method according to the first aspect, the second aspect, and the third aspect.

DETAILED DESCRIPTION

In a current technical solution, a method for optimizing remote memory access in a NUMA architecture is mainly to optimize memory allocation by using a software solution. The optimization mainly includes two aspects: optimization using a memory management module in an operating system (OS) kernel, and optimization using a NUMA-aware memory allocation acceleration library.

In a first-touch memory management method of a Linux kernel, a memory page that generates a page fault for the first time is allocated according to the memory allocation method to a NUMA node that is the same as a NUMA node of a corresponding thread. According to this method, data in the first access is further accessed by the same thread, so as to reduce remote memory access.

However, according to the first-touch memory allocation method, only information about the first memory access is used to predict a characteristic of subsequent memory access of a program; and the first-touch memory allocation method has a particular limitation, and has a limited room for optimizing a system. However, in most applications, there are usually a large amount of data shared by a plurality of threads. This solution cannot effectively reduce impact of the shared data on remote memory access in the NUMA architecture.

Figure 1:
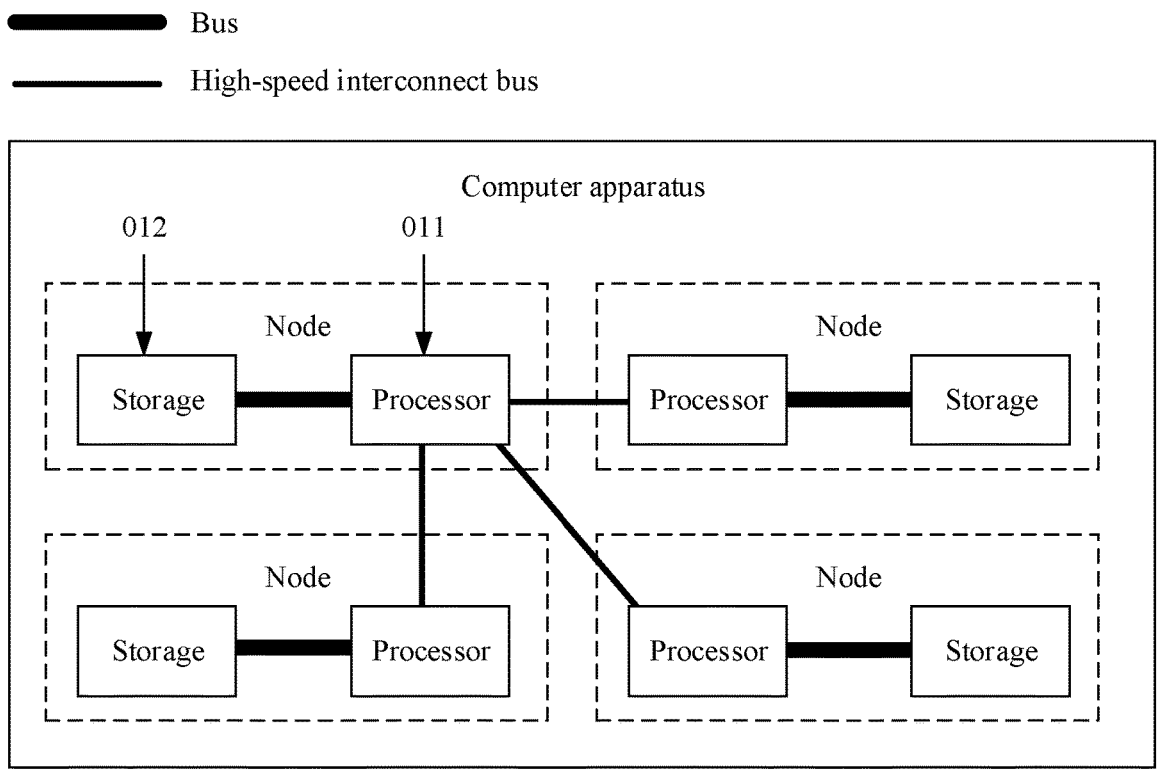
FIG. 1 is a schematic diagram of a structure of a computer apparatus using a NUMA architecture according to an embodiment.

FIG. 1 is a schematic diagram of a structure of a computer apparatus using a NUMA architecture according to an embodiment. As shown in FIG. 1, the computer apparatus includes a plurality of processors 011 and a plurality of storages 012. In addition, the plurality of processors 011 and the plurality of storages 012 form a plurality of nodes, and each node includes at least one processor 011 and one storage 012. The storage 012 may be a memory or an external storage. In addition, each node further includes a cache configured to store data frequently accessed by the processor, so as to reduce a latency and overheads generated when the processor accesses the data.

The node may also be referred to as a non-uniform memory access node. In each node, the processor 011 is connected to the storage 012 including the memory through a bus. Processors of the nodes are connected to each other through a high-speed interconnect bus (for example, a QPI bus), and a transmission rate of the high-speed interconnect bus is lower than a transmission rate of a bus connected between a processor and a memory in a node. It should be noted that FIG. 1 shows only a connection relationship between a processor of one node and a processor of another node.

A transmission rate of a bus between nodes is lower than a transmission rate of a bus between a processor and a memory in a node, and when the processor accesses a memory in another node, a data transmission distance is also greater than a distance between the processor and the memory in the same node. Therefore, in the NUMA architecture, a latency of accessing, by a processor, data in a memory in a node in which the processor is located is less than a latency of accessing a memory in another node by the processor. When the processor accesses memories in two other nodes, considering a factor of a data transmission distance, a latency of accessing data in a memory in a closer node by the processor is less than a latency of accessing data in a memory in a farther node by the processor. Therefore, to reduce a latency generated due to memory data access by a processor in a computing system, when data frequently invoked by the processor is stored in a cache to increase a cache hit rate of the computing system, a probability that a memory in a node farther away from the processor needs to be accessed due to occurrence of a cache miss also needs to be reduced as much as possible.

In an LRU replacement algorithm, only time that elapses since a cache line is last accessed is considered, but a distance between a memory in which data in the cache line is located and a processor is not considered. To resolve the foregoing problem and reduce a latency generated due to memory access by a processor, a concept of a replacement priority is introduced, and is used as a basis for the computing system to determine how to replace a cache line in a cache.

Figure 2:
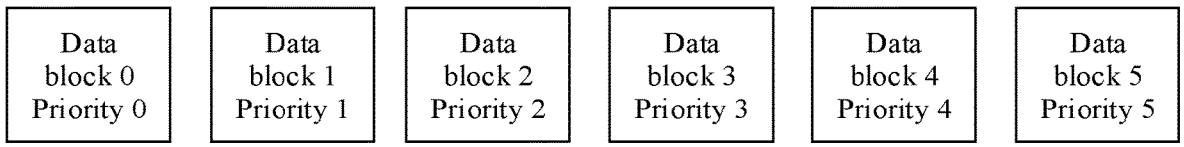
FIG. 2 is a schematic diagram in which replacement priorities are configured for data blocks in cache space according to an embodiment.

FIG. 2 is a schematic diagram in which replacement priorities are configured for data blocks in cache space according to an embodiment.

As shown in FIG. 2, cache space in a NUMA node in a computing system includes six cache lines, which are respectively used to store a data block 0 to a data block 5. To better manage the cache space, a processor sets replacement priorities for the data blocks in the cache space, and determines a replacement sequence of the data blocks based on the replacement priorities. As shown in FIG. 2, values of the replacement priorities corresponding to the data block 0 to the data block 5 in the storage space are 0 to 5 respectively. It should be noted that, for ease of description, that a data block with a larger replacement priority value in the cache space is more preferentially replaced is used as an example for description. To be specific, the data block 5 with a largest replacement priority value in the cache space is most preferentially replaced. However, a replacement policy may alternatively be set so that a data block with a smaller replacement priority value is more preferentially replaced.

For the data blocks in the storage space, the computing system allocates initial replacement priorities to these data blocks, and the replacement priorities of these data blocks subsequently change based on a status of access to the cache space by the processor. An initial replacement priority of a data block is determined based on an access attribute of the data block. To be specific, when the data block is written into the cache space, the computing system allocates the replacement priority of the data block in the cache space based on the access attribute of the data block.

It should be noted that, because each NUMA node includes a processor and corresponding cache space, for same cache space, relative to processors in different NUMA nodes in a NUMA architecture, a replacement priority of a data block in the cache space is set to be different. For ease of description, a policy of setting and updating replacement priorities of data blocks in cache space relative to a processor in a same NUMA node is discussed. In addition, a representation manner in which a processor sets and updates a replacement priority for a data block in cache space is mainly used for description. Actually, it may also be considered that the processor sets and updates a replacement priority for a cache line that stores the data block in the cache space. The two representation manners are essentially the same.

An initial priority of a data block in the cache space is determined based on an access attribute of the data block, and the access attribute of the data block is mainly related to a home NUMA node of the data block. The home NUMA node of the data block is a NUMA node to which a home memory address of the data block points. Specifically, the data block in the cache space is obtained by copying, from a memory according to a specific policy, a data block that needs to be frequently accessed by the processor and writing the data block into the cache space to facilitate access by the processor. When a data block is copied from the memory and written into the cache space, the data block is still stored in the memory. The computing system may determine, based on an address of the data block in the memory, a NUMA node to which the memory address points. In other words, a home NUMA node of a data block is a NUMA node in which a memory storing the data block is located.

For setting of an initial replacement priority of a data block, this disclosure provides a plurality of methods for determining the initial replacement priority of the data block based on an access attribute of the data block.

In a method for determining an initial replacement priority, an access attribute of a data block includes a distance between a home NUMA node of the data block and a selected NUMA node, that is, based on a distance between a NUMA node in which a memory storing the data block is located and the selected NUMA node, an initial replacement priority that a data block in the memory has when the data block is written into cache space is determined. The selected NUMA node is a NUMA node in which a data access operation is currently being performed, a selected processor is a processor that is currently performing a data access operation, and the selected NUMA node or processor may be any NUMA node or processor in the computing system. A distance between NUMA nodes may be determined by using different methods. For example, a distance between a home memory of a data block and a processor in a selected NUMA node may be used as the distance between NUMA nodes. In the NUMA architecture, for the processor in the selected NUMA node, when the processor accesses a memory in the NUMA node in which the processor is located, an access speed is relatively higher, and a latency is relatively lower; and when the processor accesses a memory in an adjacent NUMA node, an access speed is relatively lower, and a latency is also higher than that of accessing a memory in the local node. When the processor accesses a memory in a node with a longer distance, as a data transmission distance increases, an access speed further slows down, and a latency also further increases. Based on the foregoing characteristic, if the selected processor needs to obtain a to-be-read data block from a memory in a long-distance NUMA node because the to-be-read data block is not hit in a cache, a large quantity of overheads are required. Therefore, the computing system sets lower initial replacement priorities for data blocks in a memory in a NUMA node that is farther away from the selected NUMA node, so that after the data blocks in the memory are stored in cache space of the selected NUMA node, the data blocks are not easily replaced; and relatively, the computing system sets higher initial replacement priorities for data blocks in a memory in a NUMA node that is closer to the selected NUMA node and a memory in the selected NUMA node, so that the data blocks in the memories can be preferentially replaced after being stored in the cache.

Specifically, the computing system may obtain distances of NUMA nodes by using a basic input/output system (BIOS), so as to determine distances between a selected NUMA node and memories in the NUMA nodes, and allocate a different initial replacement priority to a data block in the memory in each NUMA node based on the distances. In a possible implementation, it is assumed that memories in NUMA nodes are divided into four groups based on distances from a selected NUMA node in a system. In this case, initial replacement priorities of data blocks in the four groups of memories may be respectively set to 0, $$\frac{A-1}{\alpha_1}, \frac{A-1}{\alpha_2}, \frac{A-1}{\alpha_3}$$

in descending order of distances, where A is a quantity of NUMA nodes in the computing system, $\alpha_i$ is a parameter, and when i is larger, $\alpha_i$ is smaller. In this way, an initial replacement priority corresponding to a data block in a memory closer to the selected NUMA node is higher. Optionally, a value of $\alpha_i$ may be adjusted, so that the initial replacement priorities of the data blocks are integers, to facilitate subsequent adjustment.

Similarly, based on relative distances between home NUMA nodes of different data blocks and a selected NUMA node, different initial replacement priorities may alternatively be allocated to the data blocks. The relative distance between the NUMA node and the selected node herein may be the preceding relative distance between a memory in which a data block is located and a processor in a selected NUMA node, or may be a relative distance between a memory in which a data block is located and a cache in a selected NUMA node.

In another method for determining an initial replacement priority, an access attribute of a data block includes any one of or any combination of the following factors: an access latency of accessing, by a processor in a selected NUMA node, a home NUMA node of the data block; a quantity of times that a processor in a selected NUMA node accesses a memory in a home NUMA node of the data block within preset time; or a corresponding cache loss rate for accessing, by a first processor, a data block in a memory in a home NUMA node of a first data block within preset time. To be specific, an initial replacement priority corresponding to a data block in each memory may be dynamically adjusted based on a characteristic of program memory access, and a ratio, in a period of time, of accessing data blocks in different memories by a processor in a selected NUMA node to time consumed for calculating overall application performance of a computing system.

Specifically, in a possible implementation, a corresponding cache miss (also referred to as a loss) impact factor may be set for each memory. A cache miss impact factor Fi of a memory may be defined as a product of a miss rate generated in a cache when data in the memory is accessed and a latency of accessing the memory. It is assumed that a latency of accessing a memory in a NUMA node by a processor in a selected NUMA node is $L_i$, and a cache miss rate of accessing a data block in the memory by the processor within a preset period of time is $\beta_i$. In this case, a miss impact factor of the memory is $Fi=\beta_i*L_i$. In addition, a cache miss impact factor of the entire system in the period of time may be expressed as $F=\Sigma_{i=0}^{n-1}\beta_i*L_i$. A cache miss impact factor of each memory and the cache miss impact factor of the entire system can be calculated according to the preceding formula. Therefore, an initial replacement priority of a data block in a memory can be obtained based on a ratio of a cache miss impact factor of the memory to the cache miss impact factor of the entire system or by comparing a cache miss impact factor of the memory with a cache miss impact factor of another memory.

In another possible implementation, an initial priority corresponding to a memory may alternatively be determined by using a latency $L_i$ of accessing a data block in the memory in a NUMA node by a selected processor and a quantity of times $N_i$ of accessing the data block in the memory by the selected processor within a preset period of time. For example, the initial replacement priority corresponding to the data block in the memory may be determined based on a result of $N_i*L_i$.

It should be noted that, for ease of description, an example in which cache space includes six cache lines is subsequently used to describe the technical solutions. Actually, a quantity of cache lines in the cache space is not limited. In addition, a replacement priority may be set to an integer or a non-integer. For ease of description, a manner of setting the replacement priority to an integer is used for description in subsequent embodiments. Actually, a form of a replacement priority value is not limited.

Figure 3:
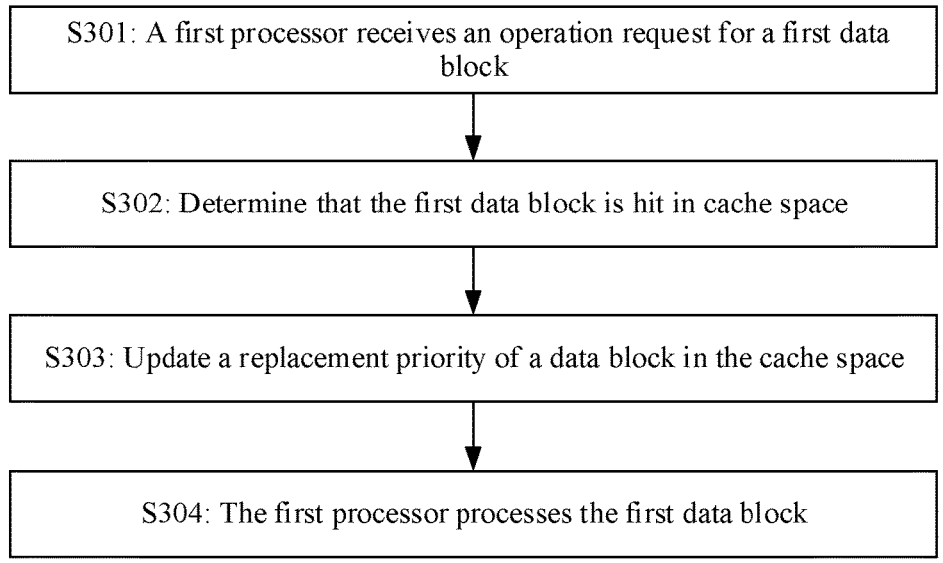
FIG. 3 is a schematic flowchart of an embodiment.

FIG. 3 is a schematic flowchart of an embodiment.

As shown in FIG. 3, this embodiment includes the following steps.

S301: A first processor receives an operation request for a first data block.

When a processor runs a program instruction, the processor often needs to invoke a data block in a memory. Because a speed of accessing a cache by the processor is higher than a speed of accessing data in the memory by the processor, when the processor needs to read data, the processor first attempts to obtain the data from a cache corresponding to the processor. Specifically, after the first processor in a first NUMA node receives the operation request for the first data block, the first processor first accesses first cache space in the first NUMA node, and determines whether the first data block is stored in the cache space.

S302: Determine that the first data block corresponding to the operation request is hit in the first cache space.

Structurally, the cache space may include several cache lines or cache blocks, where each cache line has several storage units with continuous memory addresses, and may be used to store a data block. For example, in a 32-bit computing system, a size of a data block stored in each cache line is about one double word, namely, 8 bytes. In other words, each double word has a unique block offset in the cache.

Figure 4:
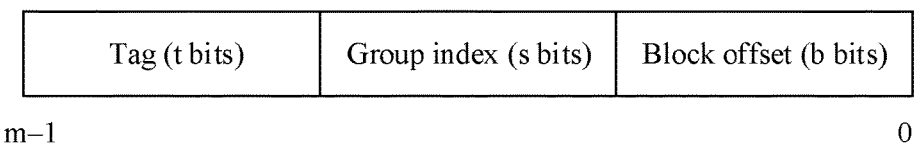
FIG. 4 is a schematic diagram of components of a cache address.

Further, FIG. 4 is a schematic diagram of components of a cache address. As shown in FIG. 4, a cache address of a computing system has m bits in total, and $M=2^m$ different addresses may be formed. A cache of the computing system is organized into an array with $S=2^s$ cache sets. Each cache set includes E cache lines. Each line includes one data block with $B=2^b$ bytes. A valid bit indicates whether the line includes meaningful information. $t=m-(b+s)$ tag bits are a subset of bits in a memory address of a current block. The tag bits, a group index, and a block offset of the address uniquely identify the data block stored in the cache line. The cache address may further include a byte offset, and the byte offset is used to indicate a specific location in which data in the data block is stored.

The following briefly describes a working procedure of cache space. For example, the cache space includes four cache lines, and each cache line may be used to store 16-byte data. Therefore, there is 64-byte storage space in total. The cache uses a write back policy to ensure data consistency. When the system is started, no data exists in the cache space. Then, data is gradually written into or replaced from the cache. When the processor executes a data read instruction, the following procedure may be used as control logic: First, locate a corresponding cache line by using an index in the data read instruction. Second, use a tag to attempt to match a corresponding tag value of the cache line. If such a match exists, it is referred to as a hit; otherwise, it is referred to as a miss. Third, if a hit occurs in the second step, extract a specific data segment in the located cache line based on a block offset, and send the specific data segment to the processor. Fourth, if a miss occurs in the second step, first use the address (tag+index) to read data from a memory and load the data to the current cache line, and then use the block offset to extract a data block in the cache line and send the data block back to the processor. It should be noted that read data overwrites previous data. To ensure data consistency, existing content in the data block needs to be written back into the memory first. In addition, even if a capacity of data requested by the processor is less than a size of data stored in a cache line, the cache still needs to fill the entire cache line when reading data. Reading of data in cache space is cache line size alignment. For a 16-byte cache line, any miss caused by 0x0000, 0x0001, 0x0002, or 0x0003 causes all four words located in 0x0000 to 0x0003 in the memory to be read into the block. For example, in this case, if an address requested by the processor is from 0x0020 to 0x0023, or from 0x0004 to 0x0007, or from 0x0528 to 0x052B, or from 0x05EC to 0x05EF, a hit occurs. For all the other addresses, a miss occurs. When the processor executes a data write instruction, the following procedure is used as control logic: A corresponding cache block is located by using an index. A tag is used to attempt to match a corresponding tag value of the cache block. A result thereof is a hit or a miss. If the result is a hit, a target word in the block is located by using an intra-block offset. Then, the word is directly rewritten. If the result is a miss, based on different system designs, there are two processing policies, which are respectively referred to as write allocate and no-write allocate. For write allocate, first, miss data is read into the cache, which is like processing of a read miss, and then, the data is written into a read word unit. For no-write allocate, data is directly written back into the memory.

According to the foregoing cache working procedure, a first processor determines, based on information that is about a first data block and that is carried in an operation request, that the first data block corresponding to the operation request is hit in first cache space.

Figure 5:
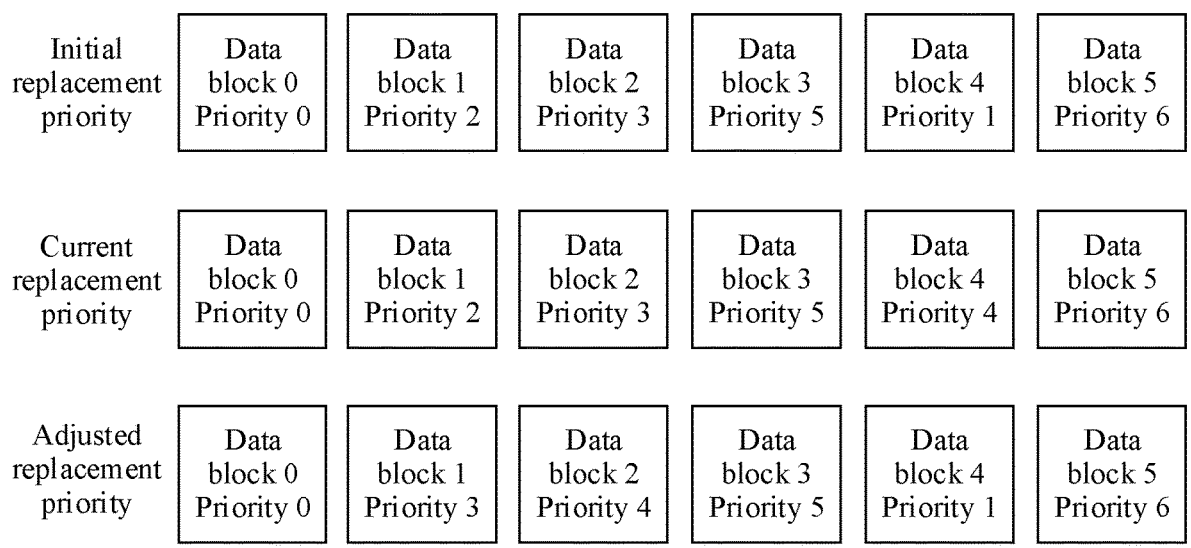
FIG. 5 is a schematic diagram of a type of updating a replacement priority of a data block in cache space according to an embodiment.

For ease of description, FIG. 5 shows current replacement priorities of data blocks, and a status of changes, of replacement priorities of the data blocks, that occur when data corresponding to an operation request is hit in a cache according to an embodiment. The $1^{st}$ row in FIG. 5 represents initial replacement priorities corresponding to the data blocks, and the $2^{nd}$ row in FIG. 5 represents the current replacement priorities of the data blocks. As shown in FIG. 5, values of initial replacement priorities corresponding to data blocks 0 to 5 are 0, 2, 3, 5, 1, and 6 respectively. As described above, the initial replacement priorities corresponding to these data blocks are determined based on access attributes of these data blocks. An access attribute of a data block includes at least one or a combination of the following factors: a distance between a home NUMA node of the data block and the first NUMA node; an access latency generated when the first processor accesses a home NUMA node of the data block; a quantity of times that the first processor accesses a memory in a home NUMA node of the data block within preset time; or a corresponding cache loss rate for accessing, by the first processor, a data block in a memory in a home NUMA node of the data block within preset time.

Values of current replacement priorities corresponding to the data blocks 0 to 5 are 0, 2, 3, 5, 4, and 6 respectively. Because the value of the replacement priority corresponding to the data block 0 is the smallest, and the value of the replacement priority corresponding to the data block 5 is the largest, replacement of the data block 5 has a highest priority, and replacement of the data block 0 has a lowest priority.

It is assumed that the first data block indicated in the operation request is the data block 4. Because the data block 4 is in the cache space, it is determined that the to-be-accessed data indicated by the operation request is hit in the cache.

S303: Update a priority of a data block in the cache space.

A possibility that the data block is accessed by the processor needs to be considered for setting and updating the replacement priority. In steps S301 and S302, the processor requires to access the data block 4, and the data block 4 is hit in the cache. Therefore, according to a principle of memory access locality, there is a higher probability that the data block 4 is subsequently accessed by the processor again. Therefore, the replacement priority of the data block 4 needs to be adjusted. However, the initial replacement priorities corresponding to the data blocks are different. To prevent a case in which a data block with a lower initial replacement priority is not replaced even if the data block is not accessed by the processor for a long time, when a replacement priority of a cache line storing the data block 4 is adjusted, replacement priorities of the other cache lines may also be adjusted.

Figure 6:
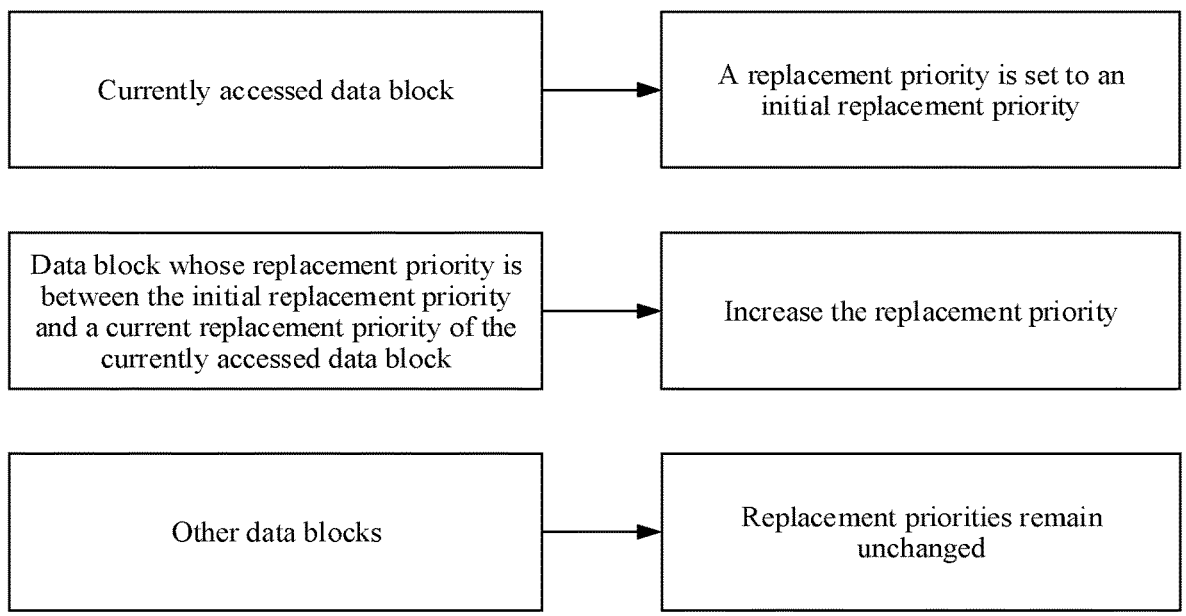
FIG. 6 is a schematic diagram of a method for adjusting a replacement priority of a data block in cache space according to an embodiment.

FIG. 6 shows a method for updating a replacement priority of a data block in cache space when a data block requested for access is hit in the cache space. As shown in FIG. 6, a replacement priority update policy of the data block includes three types of data blocks. The first type is a hit data block. In this embodiment, a replacement priority corresponding to a data block is greater than or equal to an initial replacement priority of the data block. Therefore, when a replacement priority of the hit data block needs to be adjusted, the replacement priority of the data block may be set to an initial replacement priority of the data block. If the replacement priority of the hit data block is equal to the initial replacement priority of the data block, the replacement priority of the data block is not adjusted.

A second type of data block is a data block whose replacement priority is between an initial replacement priority and a current replacement priority of the data block that corresponds to the hit data block. That is, a current replacement priority of the second type of data block is greater than or equal to the initial replacement priority of the hit data block, and is less than the current replacement priority of the hit data block. For the second type of data block, a preset value may be added to a replacement priority of each of these data blocks. For ease of description, an example in which the added preset value is 1 is used for description. However, a specific value of the added preset value is not limited.

A third type of data block is a data block other than the currently hit data block and the second type of data block. Current replacement priorities of these data blocks are lower than the initial replacement priority of the hit data block, or are higher than the current replacement priority of the hit data block. Because their replacement priorities are not affected by the adjustment of the replacement priority of the hit data block, a replacement priority of a third type of data block may not be adjusted.

The foregoing method for adjusting a priority of a data block in cache space is merely an example. Actually, another method may also be used. For example, replacement priorities of all data blocks in the cache space except the hit data block may be increased.

The $3^{rd}$ row in FIG. 5 is adjusted replacement priorities of the data blocks. As shown in FIG. 5, the data block 4 is a data block accessed by the processor. Therefore, the data block 4 is the first type of data block, and a value of the replacement priority of the data block 4 needs to be adjusted to a value of an initial replacement priority of the data block 4, that is, the value of the replacement priority is adjusted from 4 to 1. However, the initial replacement priority of the data block 4 is 1, and the current replacement priority of the data block 4 is 4. Therefore, the second type of data block is a data block whose current replacement priority is between the replacement priorities 1 and 4, namely, the data block 1 and the data block 2, and the replacement priority of the second type of data block is increased, so that values of replacement priorities of the data block 1 and the data block 2 are adjusted from 2 and 3 to 3 and 4 respectively. The third type of data block is the data block 0, the data block 3, and the data block 5, and replacement priorities of the three data blocks are not adjusted.

S304: The first processor processes the first data block.

After the replacement priorities of the data blocks are adjusted, the processor processes the first data block.

It should be noted that a sequence of the foregoing steps in this embodiment is merely an example, and a sequence of these steps is not limited. Actually, a sequence of some of the steps may be adjusted. For example, step S304 may be first performed, and then step S303 is performed. To be specific, the processor first processes the accessed first data block, and then adjusts a value of a replacement priority corresponding to each data block.

Figure 7:
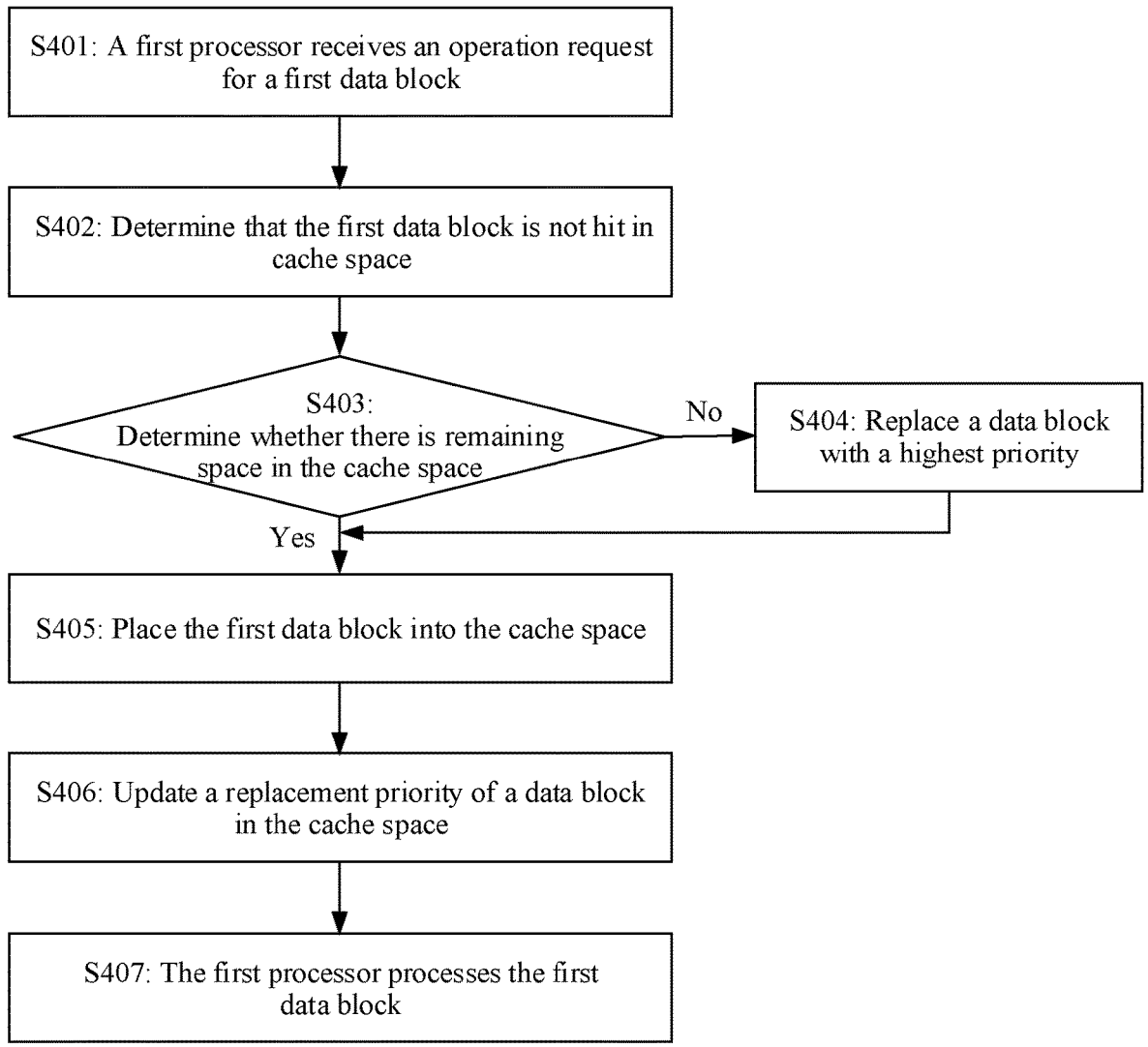
FIG. 7 is a schematic flowchart of another embodiment.

FIG. 7 is a schematic flowchart of another embodiment. As shown in FIG. 7, this embodiment includes the following steps.

S401: A first processor receives an operation request for a first data block.

For this step, refer to step S301. Details are not described herein again.

S402: Determine that the first data block corresponding to the operation request is not hit in cache space.

Contrary to step S302, it is determined that data corresponding to the operation request is not stored in the cache space, that is, the first data block requested for access is not hit in the cache space.

S403: Determine whether there is remaining space in the cache space.

When a cache miss occurs, the first processor needs to obtain data from a memory, and needs to write the obtained data into a cache, so that the data can be invoked more efficiently subsequently.

The cache may be divided into a plurality of levels. A smaller level indicates a smaller distance to the processor and a smaller capacity. A current computing system usually includes three levels of caches. A level 1 (L1) cache is generally packaged together with a processor in a same chip, has an access speed that is almost the same as that of a register and is usually two to four clock cycles, and has a size about 8 KB to 128 KB. A level 2 (L2) cache may be inside or outside a processor chip, has an access speed about 10 clock cycles, and has a size about 64 KB to 8 MB. A level 3 (L3) cache is usually shared by a multi-core processor outside a chip, has an access speed about 30 to 40 clock cycles, and has a size about 4 MB to 128 MB. In some NUMA systems, a computing system may further include a level 4 (L4) cache that is used as a remote cache of a plurality of NUMA nodes and that has a size further larger than the size of the L3 cache.

A size of the cache is smaller than that of the memory. Therefore, when a cache miss occurs and the first processor needs to write the obtained data into the cache space, a case in which a current capacity of the cache is fully written by data in the memory may occur. Consequently, no available cache line is used to store the data obtained from the memory. Therefore, whether there is the remaining space in the cache space needs to be first determined.

S404: If there is no remaining space in the cache space, replace a data block with a highest replacement priority.

In step S403, when writing the obtained data into the cache, the first processor needs to first determine whether there is the remaining space in the cache space to store the obtained data. When there is no remaining space in the cache space, data blocks stored in some cache lines need to be deleted, to provide storage space for storing the obtained data. In this case, which data in the cache space is to be deleted needs to be determined according to a cache replacement policy of the computing system. Because a replacement priority is set, a data block to be replaced may be determined based on the replacement priority.

Figures 8, 9:
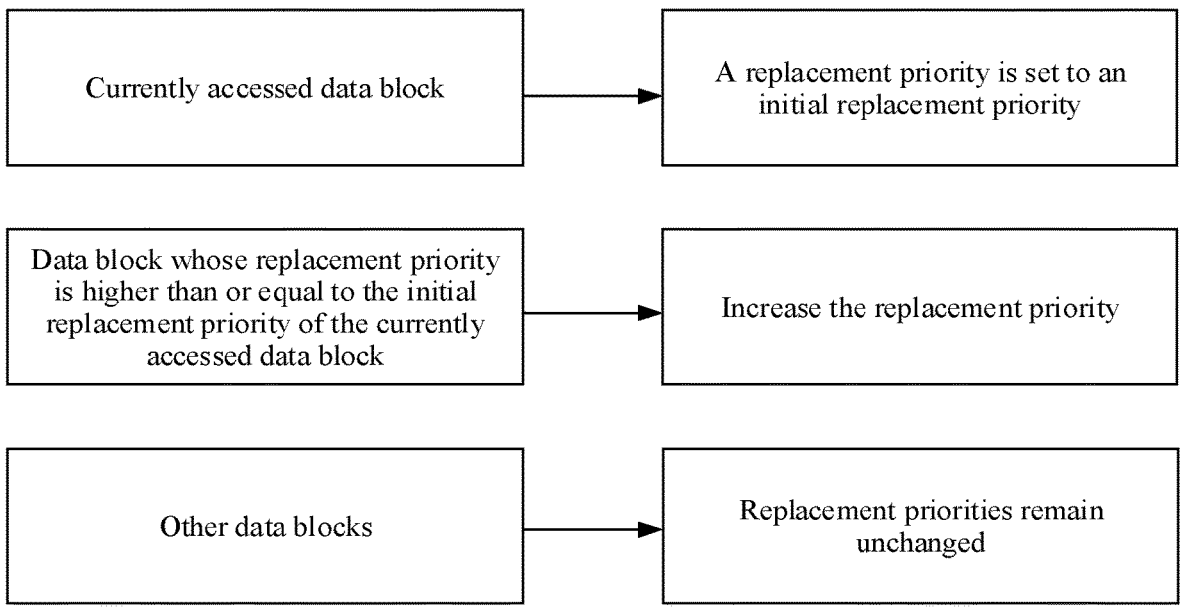
FIG. 8 is a schematic diagram of a type of updating a replacement priority of a data block according to an embodiment.
FIG. 9 is a schematic diagram of a method for adjusting a replacement priority of a data block in cache space according to an embodiment.

FIG. 8 is a schematic diagram of a type of updating a replacement priority of a data block according to an embodiment. The $1^{st}$ row and the $2^{nd}$ row in FIG. 8 respectively indicate an initial replacement priority and a current replacement priority of each data block in cache space. As shown in FIG. 8, before a write request, there are six cache lines in total in a cache, which are respectively used to store a data block 0 to a data block 5, and values of initial replacement priorities and current replacement priorities corresponding to the data block 0 to the data block 5 are respectively 0 to 5. If the cache can store only six cache lines and a cache miss occurs, a data block that has been stored in the cache needs to be replaced to provide space for storing data that is hit in a memory by an operation request. Because the current replacement priority of the data block 5 is 5, and the data block 5 is a data block with a highest replacement priority in the cache space, in this case, the data block 5 is replaced out of the cache space.

In a possible implementation, caches in the computing system further include a victim cache. The victim cache is a fully associative cache that is used together with a direct mapped cache or a low associative cache and that has a small capacity. When a data block is replaced out of the cache, the data block is not directly discarded, but is temporarily stored in the victim cache. If the victim cache is full, a data block in the victim cache is replaced with the data block. When cache tag matching is performed, the victim cache is checked in parallel when an index pointing tag is matched with. If a match is found in the victim cache, the data block is swapped with an unmatched data block in the cache, and is returned to a processor. A purpose of setting the victim cache is to compensate for time locality lost due to frequent replacement caused by low association.

S405: Place the to-be-accessed first data block into the cache space.

When a cache miss occurs, the data that is hit in the memory and corresponds to the operation request needs to be stored in the cache. Regardless of a case in which it is determined in step S403 that the cache has the remaining space, or a case in which it is determined in step S403 that no cache space exists but the remaining space is generated by replacing the data block with the highest replacement priority in step S404, because the cache has the remaining space, the data block corresponding to the operation request may be placed in the cache.

S406: Update a replacement priority of a data block in the cache space.

FIG. 9 shows a method for updating a replacement priority of a data block in a cache when data corresponding to an operation request is not hit in the cache. As shown in FIG. 9, when a hit data block in the memory is written into a cache line, an initial replacement priority corresponding to the data block needs to be determined, and a replacement priority of another data block in the cache is adjusted based on the initial replacement priority. The initial replacement priority corresponding to the data block may be determined according to the policy mentioned above, that is, based on an access attribute of the data block.

For another data block in the cache space, adjustment needs to be performed based on a relationship between a current replacement priority of the data block and an initial replacement priority of a currently accessed data block. In a possible implementation, for data blocks whose current replacement priorities are greater than or equal to the initial replacement priority of the currently accessed data block, a preset value is added to each of the current replacement priorities of these data blocks, to obtain an updated replacement priority. For data blocks whose replacement priorities are lower than the initial priority of the currently accessed data block, the replacement priorities of these data blocks remain unchanged.

The foregoing method for adjusting a priority of a data block in cache space is merely an example. Actually, another method may also be used. For example, replacement priorities of all data blocks in the cache space except the currently accessed data block may be increased.

Figure 10:
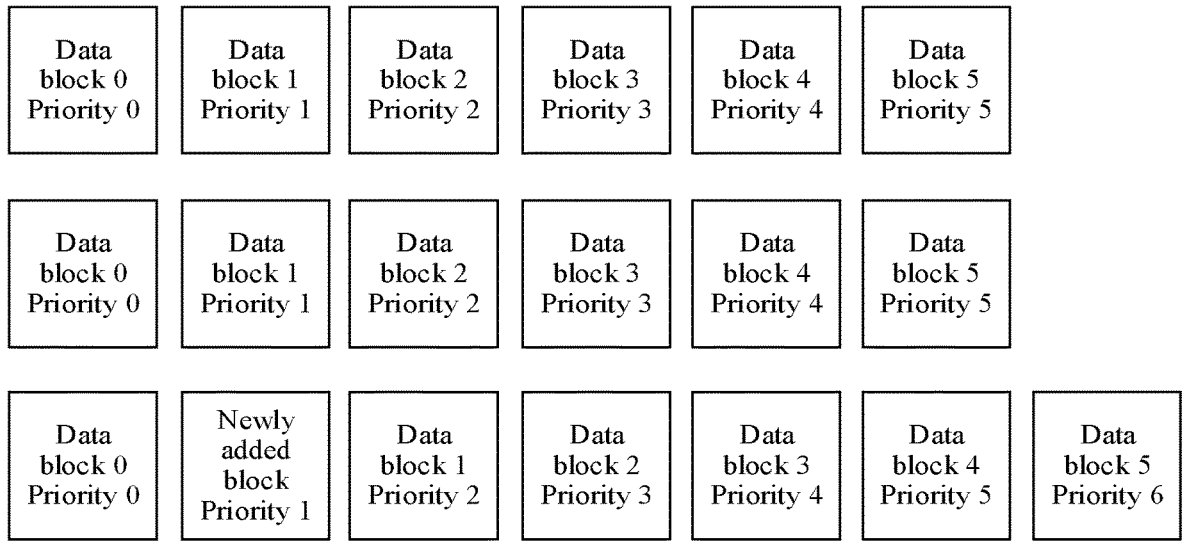
FIG. 10 is a schematic diagram of another type of updating a replacement priority of a data block in cache space according to an embodiment.

FIG. 10 is a schematic diagram of another type of updating a replacement priority of a data block according to an embodiment.

In FIG. 10, originally six cache lines in cache space store data blocks, and there are idle cache lines that may store more data blocks. When a cache miss occurs, a hit data block (referred to as a newly added block below) in the memory is written into a cache line in the cache space. To adjust a replacement priority of a data block in the cache space, an initial replacement priority corresponding to the newly added block is first determined based on an access attribute of the newly added block, and a replacement priority of the newly added block is adjusted to the initial replacement priority. An example in which a value of the initial replacement priority corresponding to the newly added block is 1 is used as an example, because the values of the current replacement priorities of the data block 1 to the data block 5 are 1 to 5 respectively, and are greater than or equal to the initial replacement priority corresponding to the newly added block, a preset value needs to be added respectively to obtain an updated replacement priority. However, the current replacement priority of the data block 0 is 0, and is lower than the initial replacement priority of the newly added block. Therefore, the replacement priority of the data block 0 does not need to be adjusted.

However, in FIG. 8, there are originally six cache lines in cache space, and the cache space may store only six cache lines. Refer to step S404. When a cache miss occurs, the data block 5 with the highest current replacement priority is replaced out of the cache space, to provide storage space in the cache space for the currently hit data block. It is similar to FIG. 10 that, when it is determined that the initial replacement priority corresponding to the newly added block is 1, because the current replacement priorities of the data block 1 to the data block 4 are a priority 1 to a priority 4 respectively, and are greater than or equal to the initial replacement priority of the newly added block, a preset value needs to be added respectively to obtain an updated replacement priority. However, the current replacement priority of the data block 0 is 0, and is lower than or equal to the initial replacement priority of the newly added block. Therefore, the replacement priority of the data block 0 does not need to be adjusted.

S407: The first processor processes the first data block.

Figure 11:
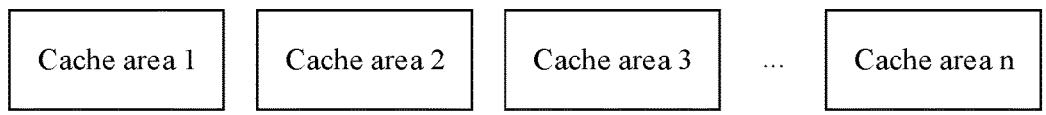
FIG. 11 is a schematic diagram of another cache space.

FIG. 11 is a schematic diagram of another cache space.

As shown in FIG. 11, the cache space is divided to form a plurality of cache areas, and each cache area includes a plurality of cache lines, and therefore may also be referred to as a cache line set. Different cache areas are used to store data in different memories, and data in the cache areas does not affect each other.

Figure 12:
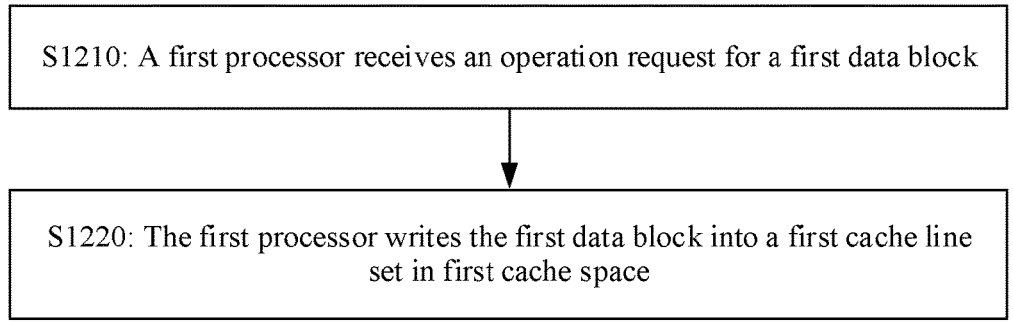
FIG. 12 is a flowchart of another embodiment.

FIG. 12 is a flowchart of another embodiment.

As shown in FIG. 12, this embodiment includes the following steps.

S1210: A first processor receives an operation request for a first data block, where the first processor is a processor in a first NUMA node.

In this embodiment, cache space is divided into a plurality of cache areas that respectively correspond to different memories. Therefore, when the first processor needs to write the first data block into a cache, the first processor first needs to determine a memory in which the first data block is located, so as to select a corresponding cache area for writing.

S1220: The first processor writes the first data block into a first cache line set in first cache space, where the first cache space is cache space in the first NUMA node, and the first cache line set corresponds to a memory in a home NUMA node of the first data block.

When determining the home NUMA node of the first data block, the first processor determines a first cache line set that corresponds, on the NUMA node, to the first data block, and writes the first data block into an unoccupied cache line in the first cache line set.

In an implementation, when the first cache line set is fully occupied, a data block stored in the cache line set is selected according to a preset replacement policy, and the data block is replaced out of the cache space. The preset replacement policy may be an existing policy such as an LRU replacement algorithm, or may be a policy that is provided in this disclosure to determine a to-be-replaced data block based on a value of a replacement priority.

It should be noted that, although this disclosure is described by using a data replacement policy in a cache in a NUMA architecture as an example, actually, in the NUMA architecture, for any storage that needs to store data frequently accessed by the processor, so as to reduce overheads generated by obtaining data from another storage when a miss occurs, the data replacement policy provided may be used. For example, a computing system using the NUMA architecture may use a mechanical hard disk drive with a large capacity to store all data of the computing system, and use a solid-state drive (SSD) with a small capacity but a high read speed to store data that a processor frequently needs to read. In this case, a data replacement policy in the SSD may also be implemented by using a solution provided. In this scenario, a storage entry in the SSD is equivalent to a cache line in the cache in the foregoing embodiment, and a mechanical hard disk drive of each NUMA node is equivalent to a memory in the foregoing embodiment.

Figure 13:
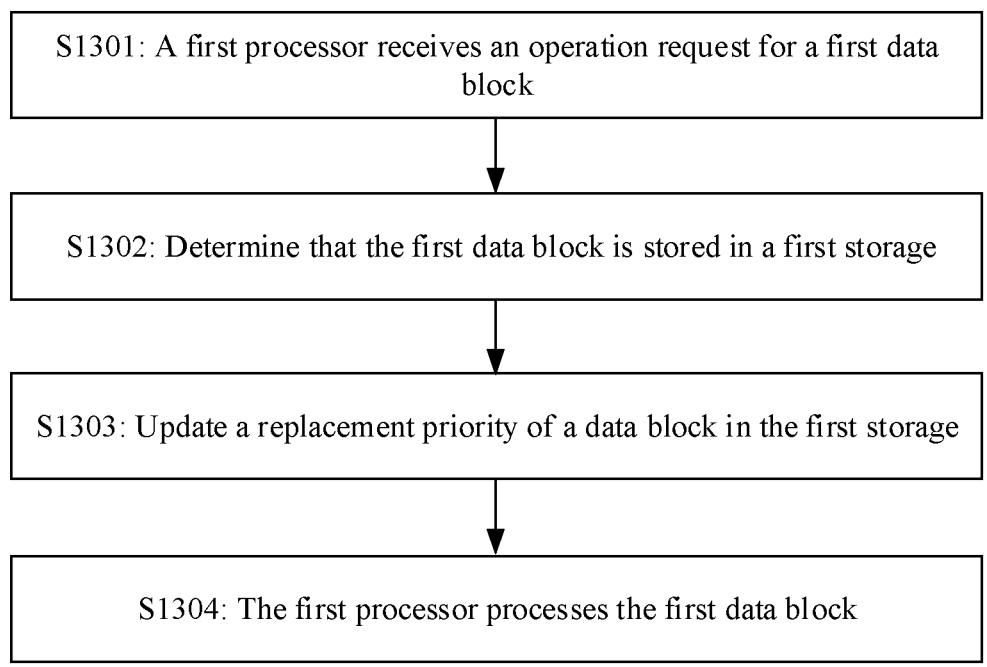
FIG. 13 is a flowchart of another embodiment.

FIG. 13 is a schematic flowchart of another embodiment. This embodiment is applied to a computing system using a NUMA architecture. The computing system includes a first storage set and a second storage set. Both storages in the first storage set and storages in the second storage set are distributed in NUMA nodes. A storage capacity of a storage in the first storage set is smaller, but a speed of accessing the storage in the first storage set by a processor is higher. A storage capacity of a storage in the second storage set is larger, but a speed of accessing the storage in the second storage set by the processor is lower. Therefore, the first storage set is mainly used to store data that needs to be frequently processed by the processor, also referred to as hot data; and the second storage set needs to store data accessed by the processor at a low frequency, also referred to as cold data. Because the storage capacity of the storage in the first storage set is smaller, the stored data needs to be replaced based on a factor such as an access frequency of the processor. This embodiment provides a replacement policy applicable to the computing system in the NUMA architecture.

S1301: A first processor receives an operation request for a first data block.

A first node in the computing system in the NUMA architecture includes the first processor, a first storage in the first storage set, and a second storage in the second storage set. A data block in each storage in the second storage set has a corresponding initial replacement priority relative to a selected processor.

When the first processor needs to access data, the first processor first searches the first storage to determine whether the first data block is stored in the first storage.

S1302: Determine that the first data block is stored in the first storage.

S1303: Update a replacement priority of a data block in the first storage.

When data corresponding to a read operation request is stored in the first storage, a replacement priority of each data block in the first storage may be updated by referring to the method for updating a replacement priority of a data block in step S303. To be specific, based on an access attribute of the to-be-accessed first data block, a replacement priority of the first data block is adjusted to an initial replacement priority corresponding to the first data block, and a replacement priority of a data block whose current replacement priority is between the initial replacement priority and the current replacement priority of the first data block is increased.

S1304: The first processor processes the first data block.

Figure 14:
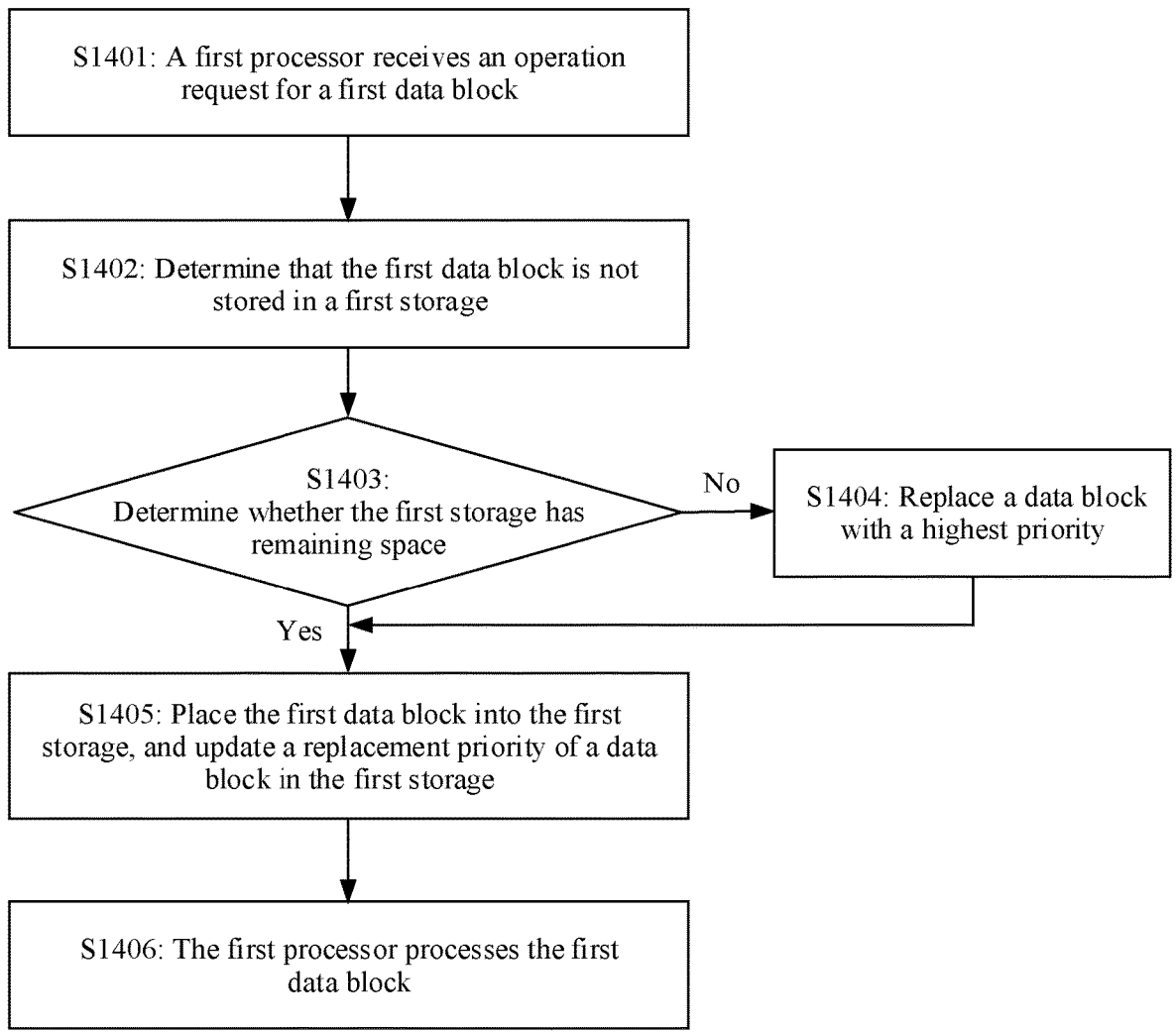
FIG. 14 is a schematic flowchart of another embodiment.

FIG. 14 is a schematic flowchart of another embodiment.

S1401: A first processor receives an operation request for a first data block.

It is similar to the system architecture provided in FIG. 13 that, a first node in a computing system in the NUMA architecture includes a processor, a first storage in a first storage set, and a second storage in a second storage set, where the first data block is stored in the second storage. A data block in each storage in the second storage set has a corresponding initial replacement priority relative to a selected processor.

S1402: Determine that the first data block is not stored in the first storage.

S1403: Determine whether the first storage has storage space to store the first data block.

S1404: If the storage space is not plenty, replace a data block with a highest replacement priority.

S1405: Store the to-be-read first data block into the first storage, and update a replacement priority of a data block in the first storage.

When a to-be-read first data block is stored into a storage entry in the first storage, a replacement priority of each data block in the first storage may be updated by referring to the method for updating a replacement priority of a data block in step S406. To be specific, a replacement priority of the first data block in the first storage is updated to an initial replacement priority corresponding to the first data block, and a replacement priority of a data block whose current replacement priority is between the current replacement priority of the first data block and the initial replacement priority is increased.

S1406: The first processor processes the first data block.

Figure 15:
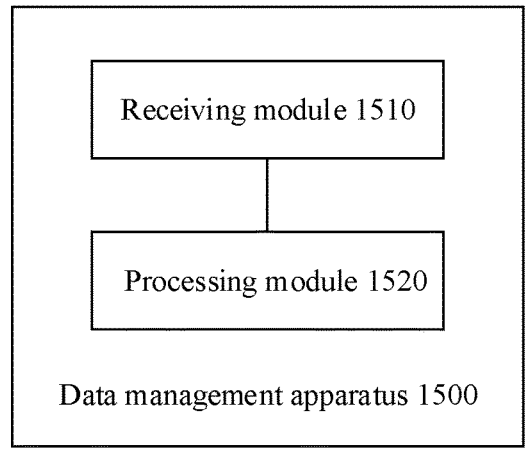
FIG. 15 is a schematic diagram of a data management apparatus.

FIG. 15 is a schematic diagram of a data management apparatus according to an embodiment. The data management apparatus is used in a computing system. The computing system includes a plurality of NUMA nodes, and each NUMA node includes a processor and a memory. The data management apparatus is a processor in a first NUMA node in the plurality of NUMA nodes. As shown in FIG. 15, the data management apparatus includes: a receiving module 1510 configured to receive an operation request for a first data block; and a processing module 1520 configured to: process the first data block, and allocate a replacement priority of the first data block in first cache space based on an access attribute of the first data block, where the first cache space is cache space in the first NUMA node, the access attribute of the first data block includes a distance between a home NUMA node of the first data block and the first NUMA node, and the home NUMA node of the first data block is a NUMA node to which a home memory address of the first data block points.

The data management apparatus shown in FIG. 15 is further configured to perform the methods disclosed in FIG. 3, FIG. 7, FIG. 12, FIG. 13, and FIG. 14. Specifically, the receiving module 1510 is configured to perform steps S301, S401, S1201, S1301, and S1401, and the processing module is configured to perform steps S302 to S304, S402 to S407, S1202, S1302 to S1304, and S1402 to S1406. Details are not described herein again.

Figure 16:
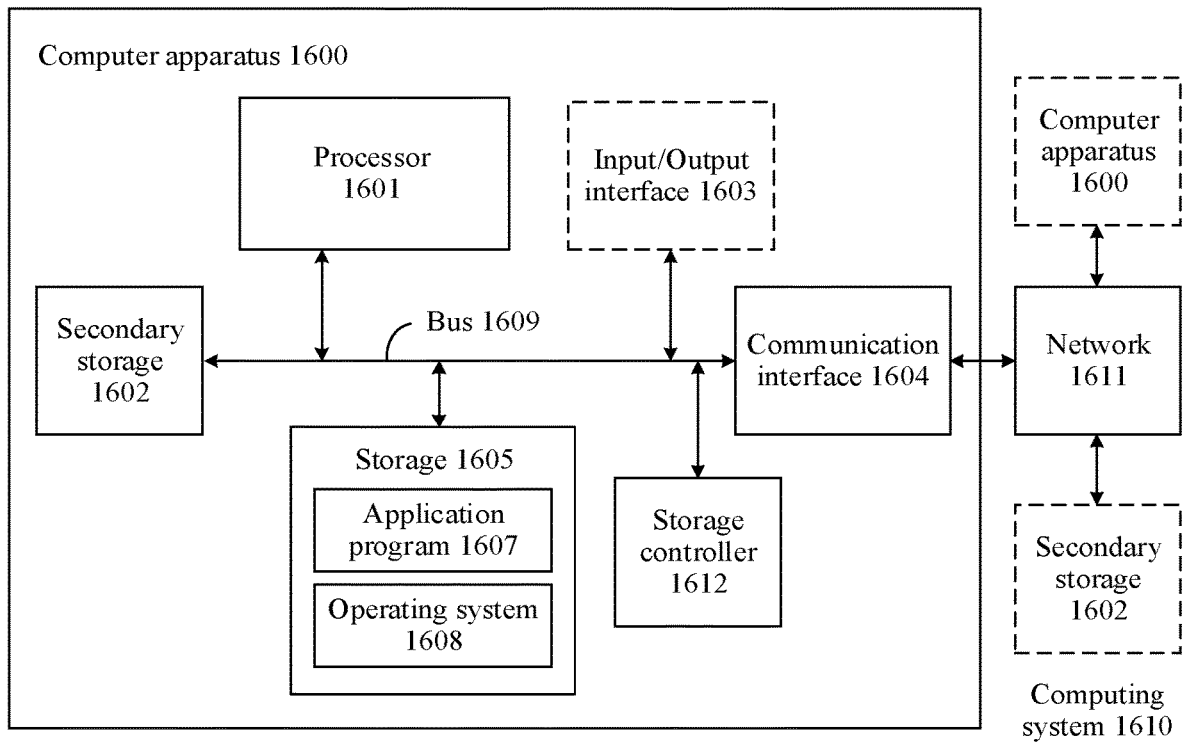
FIG. 16 is a schematic diagram of a structure of a computing system.

FIG. 16 is a schematic diagram of a structure of a computing system 1610 according to an embodiment. The computing system 1610 in this embodiment may be one specific implementation of the computing systems in the foregoing embodiments.

As shown in FIG. 16, the computing system 1610 includes a computer apparatus 1600, the computer apparatus 1600 includes a processor 1601, and the processor 1601 is connected to a storage 1605. The processor 1601 may be computational logic such as a field-programmable gate array (FPGA) or a digital signal processor (DSP), or a combination of any above computational logic. Alternatively, the processor 1601 may be a single-core processor or a multi-core processor.

The storage 1605 may be a random-access memory (RAM), a flash memory, a read-only memory (ROM), an erasable programmable ROM (EPROM), an electrically erasable programmable ROM (EEPROM), a register, or any other form of storage medium known in the art. The storage may be configured to store program instructions 1607. When the program instructions 1607 are executed by the processor 1601, the processor 1601 performs a method in the foregoing embodiments.

A connection bus 1609 is configured to transfer information between components of the computer apparatus. The connection cable 1609 may be connected in a wired connection manner or a wireless connection manner. The connection cable 1609 is further connected to a network interface 1604.

The network interface 1604 implements communication with another device or a network 1611 by using, for example but not limited to, a connection apparatus such as a cable or an electric strand. The network interface 1604 may be further wirelessly interconnected to the network 1611.

Some features of this embodiment may be completed/supported by the processor 1601 executing the program instructions in the storage 1605 or software code. Software components to be loaded in the storage 1605 may be summarized in terms of function or logic, for example, the receiving module 1510 and the processing module 1520 shown in FIG. 15.

In an embodiment, after the storage 1605 loads the program instructions, the processor 1601 executes a transaction related to the foregoing functional/logical modules in the storage.

Optionally, the computer apparatus 1600 may further include an auxiliary storage 1602 and an input/output interface 1603, and the auxiliary storage 1602 is configured to assist the storage 1605 in storing the program instructions. The input/output interface 1603 is configured to interact with an external device of the computer apparatus 1600, to obtain data input by the external device or output data to the external device.

In addition, FIG. 16 is merely an example of the computing system 1610. The computing system 1610 may include more or fewer components than those shown in FIG. 16, or have different component configuration manners. In addition, each component shown in FIG. 16 may be implemented by hardware, software, or a combination of hardware and software. For example, the storage and the processor may be implemented in one module. Instructions in the storage may be written into the storage in advance, or may be loaded in a subsequent execution process of the processor.

An embodiment further provides a computer storage medium. The storage medium stores a computer program, and the computer program is configured to perform a data management method for a storage provided.

An embodiment further provides a computer program product including instructions. When the computer program product runs on a computer apparatus, the computer apparatus is enabled to perform a data management method for a storage provided in the embodiments.

What is claimed is:

1. A data management method implemented by a first processor in a first non-uniform memory access (NUMA) node of a plurality of NUMA nodes in a computing system, the data management method comprising:
   receiving an operation request for a first data block associated with an access attribute, wherein the access attribute comprises a distance between a home NUMA node of the first data block and the first NUMA node, a quantity of times that the first processor has accessed a memory in the home NUMA node within a first preset time, and a corresponding cache loss rate for accessing a data block in the memory within a second preset time, and wherein the first data block comprises a home memory address pointing to the home NUMA node;
   processing the first data block; and
   allocating, based on the access attribute, a first replacement priority of the first data block in a first cache space of the first NUMA node.

2. The data management method of claim 1, wherein a larger distance from the home NUMA node to the first NUMA node indicates a lower replacement priority of the first data block, and wherein the lower replacement priority indicates that the first data block has been stored in the first cache space for a longer time.

3. The data management method of claim 1, wherein the access attribute further comprises an access latency generated when the first processor accesses the home NUMA node.

4. The data management method of claim 1, wherein processing the first data block comprises writing, when the first cache space should not store the first data block, the first data block into the first cache space.

5. The data management method of claim 4, wherein allocating the first replacement priority comprises allocating an initial replacement priority of the first data block in the first cache space.

6. The data management method of claim 5, wherein before writing the first data block, the data management method further comprises:
   determining that a second data block in the first cache space has a highest replacement priority; and
   removing the second data block from the first cache space.

7. The data management method of claim 1, wherein processing the first data block comprises determining whether the first cache space should store the first data block, and wherein allocating the first replacement priority comprises updating, when the first cache space should store the first data block, the first replacement priority from a current value to an initial value.

8. The data management method of claim 7, further comprises adjusting a second replacement priority of a second data block in the first cache space.

9. The data management method of claim 8, wherein adjusting the second replacement priority comprises increasing a third replacement priority of a third data block, and wherein the third replacement priority is between the initial value and the current value.

10. A computing system comprising:
    non-uniform memory access NUMA nodes comprising a first NUMA node, wherein the first NUMA node comprises a first processor configured to:
      receive an operation request for a first data block, associated with an access attribute, wherein the access attribute comprises a distance between a home NUMA node of the first data block and the first NUMA node, a quantity of times that the first processor has accessed a memory in the home NUMA node within a first preset time, and a corresponding cache loss rate for accessing a data block in the memory within a second preset time, and wherein the first data block comprises a home memory address pointing to the home NUMA node;
      process the first data block; and
      allocate, based on the access attribute, a first replacement priority of the first data block in a first cache space of the first NUMA node.

11. The computing system of claim 10, wherein a larger distance from the home NUMA node to the first NUMA node indicates a lower replacement priority of the first data block, and wherein the lower replacement priority indicates that the first data block has been stored in the first cache space for a longer time.

12. The computing system of claim 10, wherein the access attribute further comprises an access latency generated when the first processor accesses the home NUMA node.

13. The computing system of claim 10, wherein the first processor is further configured to further process the first data block by writing, when the first cache space should not store the first data block, the first data block into the first cache space.

14. The computing system of claim 13, wherein the first processor is further configured to further allocate the first replacement priority by allocating an initial replacement priority of the first data block in the first cache space.

15. The computing system of claim 14, wherein before writing the first data block, the first processor is further configured to:

determine that a second data block in the first cache space has a highest replacement priority; and
remove the second data block from the first cache space.

16. The computing system of claim 10, wherein the first processor is configured to:
    further process the first data block by determining whether the first cache space should store the first data block; and
    further allocate the first replacement priority by updating, when the first cache space should store the first data block, the first replacement priority from a current value to an initial value.

17. The computing system of claim 16, wherein the first processor is further configured to adjust a second replacement priority of a second data block in the first cache space.

18. The computing system of claim 17, wherein the first processor is further configured to adjust the second replacement priority by increasing a third replacement priority of a third data block, and wherein the third replacement priority is between the initial value and the current value.

19. A data management method implemented by a first processor in a first non-uniform memory access (NUMA) node of a plurality of NUMA nodes in a computing system, the data management method comprising:
    receiving an operation request for a first data block associated with an access attribute, wherein the access attribute comprises a distance between a home NUMA node of the first data block and the first NUMA node, a quantity of times that the first processor has accessed a memory in the home NUMA node within a first preset time, and a corresponding cache loss rate for accessing a data block in the memory within a second preset time;
    selecting a first cache space of the first NUMA node based on the memory; and
    writing the first data block into a first cache line set in the first cache space,
    wherein the first cache line set corresponds to the home NUMA node.

20. The data management method of claim 19, wherein before writing the first data block, the data management method further comprises determining the first cache line set is of the first cache space and corresponds to the first data block.

* * * * *